March 25, 1941.   E. V. BOREL   2,236,231
DEVICE FOR ELECTRICALLY HEATING DRAWING KILNS FOR SHEET GLASS
Filed Nov. 5, 1937   3 Sheets-Sheet 1
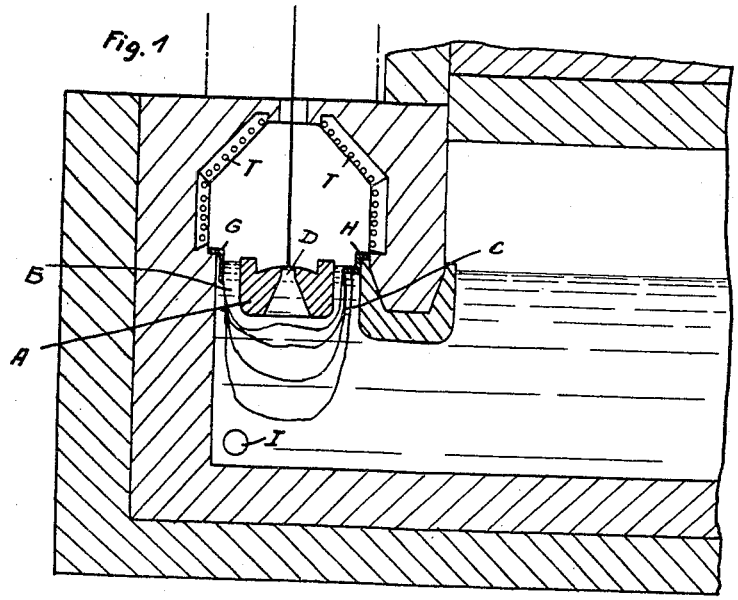
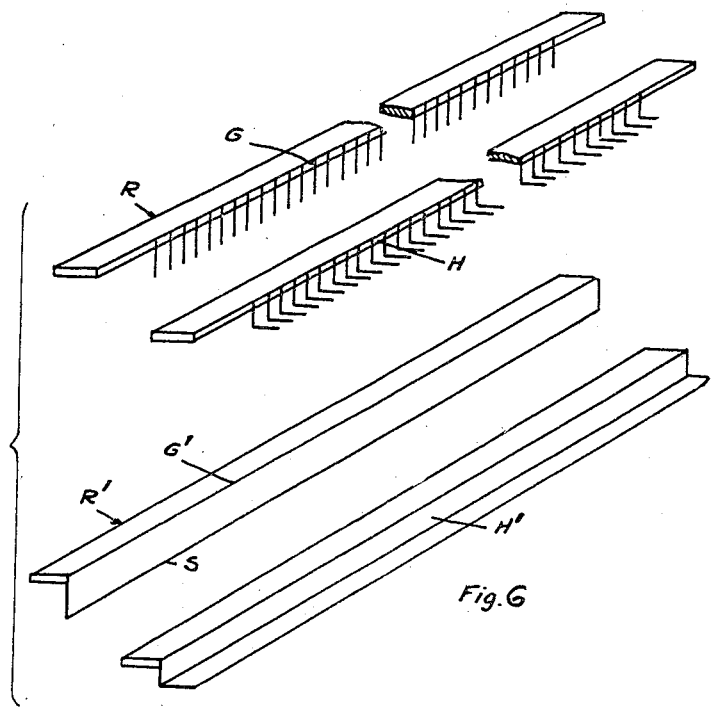
INVENTOR
EDOUARD VIRGILE BOREL
BY
Richards & Geier
ATTORNEYS March 25, 1941.  E. V. BOREL  2,236,231
DEVICE FOR ELECTRICALLY HEATING DRAWING KILNS FOR SHEET GLASS
Filed Nov. 5, 1937  3 Sheets-Sheet 2
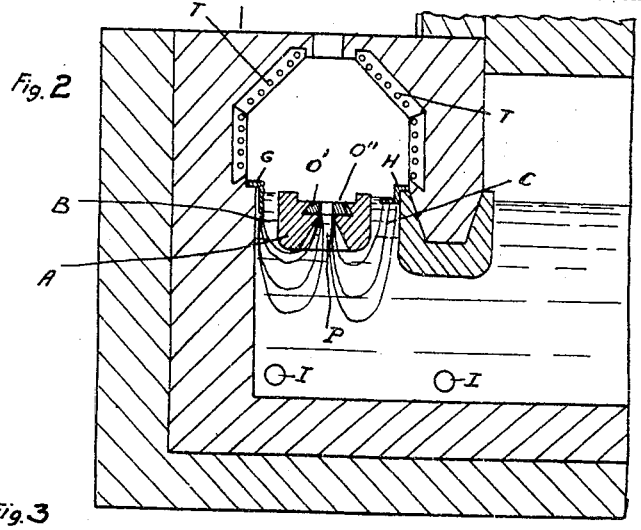
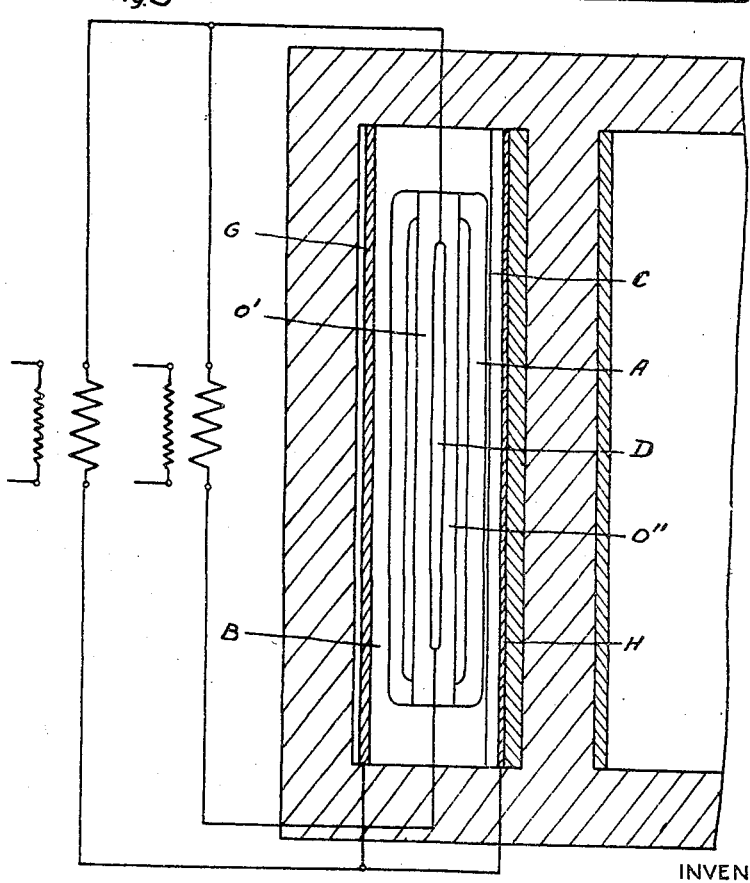
INVENTOR
EDOUARD VIRGILE BOREL
BY
Richards & Geier
ATTORNEYS March 25, 1941.  E. V. BOREL  2,236,231
DEVICE FOR ELECTRICALLY HEATING DRAWING KILNS FOR SHEET GLASS
Filed Nov. 5, 1937  3 Sheets-Sheet 3
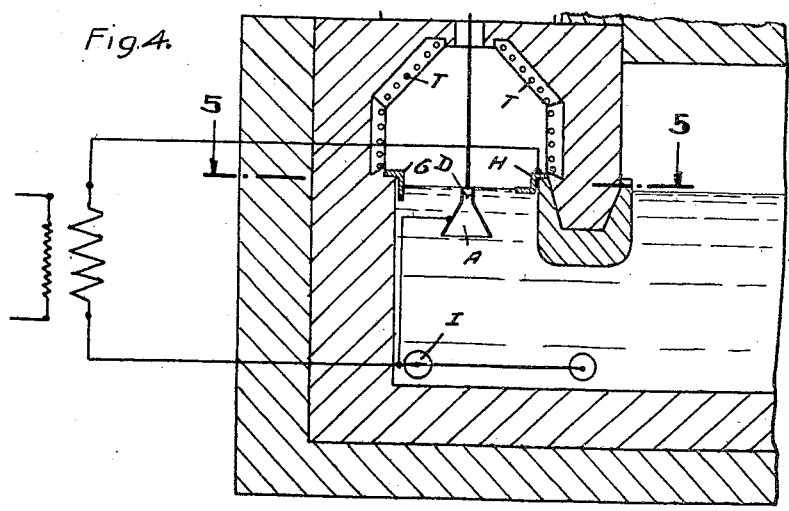
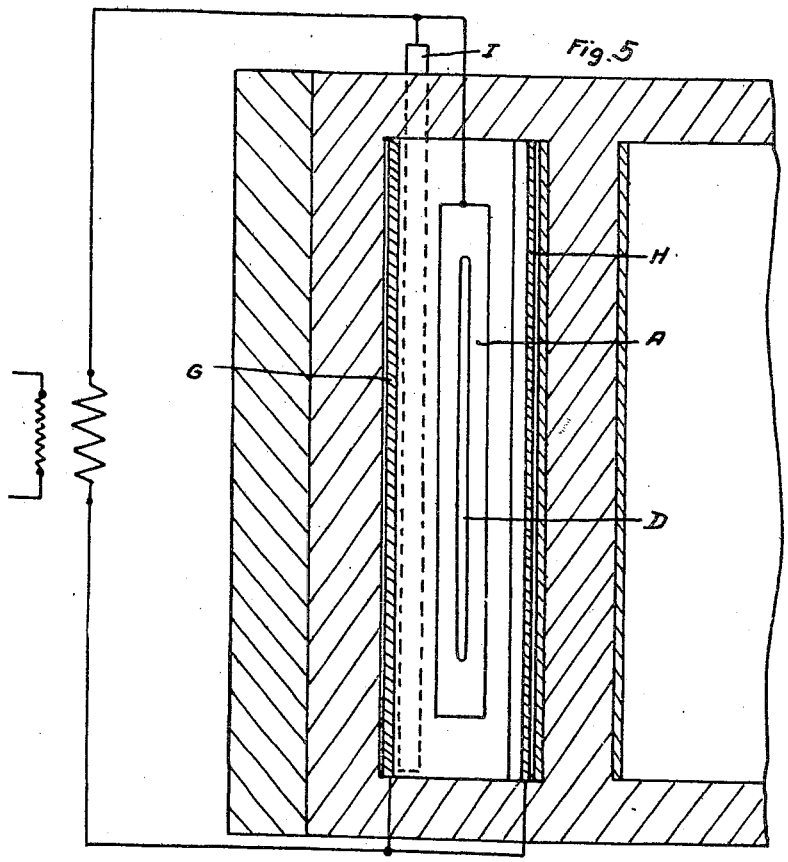
INVENTOR
EDOUARD VIRGILE BOREL
BY
Richards & Geier
ATTORNEYS Patented Mar. 25, 1941

2,236,231

UNITED STATES PATENT OFFICE 2,236,231

DEVICE FOR ELECTRICALLY HEATING DRAWING KILNS FOR SHEET GLASS

Edouard Virgile Borel, Romont, Switzerland, assignor to Société Anonyme des Manufactures des Glaces et Produits Chimiques de Saint Gobain, Chauny & Cirey, Paris, France, a corporation of France Application November 5, 1937, Serial No. 172,970
In Great Britain November 11, 1936

9 Claims. (Cl. 49—54)

It is well known that the drawing of sheet glass by a mechanical process, includes for certain systems, for example, the Fourcault process (this process being taken as example in the following description, but other systems may also arise), one or more members immersed in the bath of glass. In the Fourcault system this member, known as a delivery device, forms, between itself and the side walls of the kiln in which it is contained, spaces in which the glass is practically stationary. By reason of this stationary position and also by reason of the temperature, favourable to crystallization of the glass, which exists in the said spaces, the glass crystallizes and in the course of time it enters into the slot of the delivery device. Periodically, for instance about every five or six days, this phenomenon entails a stoppage in manufacture and requires a reheating of the bath.

It is therefore advisable to maintain in the above mentioned spaces a temperature which is not favourable to the formation and development of crystals of devitrification. For maintaining this temperature it has been suggested to resort to electrical heating.

In the already proposed devices, electrodes, immersed in the glass bath, are arranged in the neighbourhood of the ends of the delivery device, in order that the lines of current follow paths parallel to the slot of the delivery device itself. Actually, however, the distribution of the current, which is thus obtained, is not regular, by reason of the spreading of the lines of current towards the refining chamber, the drawing kiln communicating with the said chamber at one of its sides; this spreading of the lines of current is moreover increased by the fact that the glass in the refining chamber is normally hotter and consequently electrically more conductive than the glass in the drawing kiln.

The present invention consists in arranging the electric heating electrodes, for the drawing kiln, parallel to the slot in the delivery device. These electrodes or some of them may advantageously form the lips of the delivery device. The delivery device itself may form an electrode.

The annexed drawings show by way of example several forms of the invention:

Fig. 1 is a vertical section of the drawing kiln according to a first form of construction;

Fig. 2 is a corresponding view of a modified form thereof;

Fig. 3 is a horizontal section of the drawing kiln, showing a wiring diagram of one arrangement of the electrodes;

Fig. 4 is a vertical section of the drawing kiln according to another modification of the invention;

Fig. 5 is a horizontal section, along line 5—5 of Fig. 4, showing a wiring diagram of another arrangement of the electrodes;

Fig. 6 shows in a perspective view different forms of the electrodes.

As shown in Fig. 1, the drawing kiln is provided with a normal delivery device A of known type, which forms, between itself and the side walls of the kiln in which it is contained, spaces B and C in which the glass is practically stationary, in such a way that it is necessary to heat the same in said spaces to prevent its crystallization and its devitrification, particularly in the slot D of the delivery device A. Two electrodes G and H, of which there has been shown by way of example two possible forms of construction, are placed in the direction of the length of the drawing bath and on each side thereof in such a manner that when the electrodes are connected to a source of suitable current (not shown), the current passes from one electrode to the other in the direction of the width of the drawing bath, lines of the current having approximately the shape shown in Fig. 1. This current, by the Joule effect, generates uniformly in the parts B and C a certain quantity of heat which may be selected at will in such a manner as to maintain the desired temperatures.

One or more electrodes, such as I, may also be placed at the bottom of the bath for example. It is then possible to obtain current between G and I and between H and I, for the purpose of heating the glass in the lower part of the drawing kiln. There may also be obtained a wiring diagram giving, between G and I, a current of an intensity such as to generate a larger quantity of heat in the zone B, for instance. For this arrangement, there may be used multi-phase current.

In the modification shown in Fig. 2, the slot D of the delivery device, through which the sheet of glass passes out, is not formed by two refractory lips, but by two conducting lips, for example of a metal alloy. These lips may act either as an electrode or simultaneously as electrode and resistance. When these lips act as electrodes, the wiring arrangement is for instance as follows:

The conducting lips O' and O" are connected electrically to one pole of a suitable source of current (not shown), the electrodes G and H being connected to the other pole of the same source of current. Current is thus established between O' and G, and between O" and H, and passes through the interior of the cone P of the delivery device so as to heat, in addition to the two zones B and C, the glass which is in the interior of the cone P of the delivery device and more particularly the glass in contact with the walls of this cone P, where it is known that the glass crystallises easily.

By this heating means are thus provided for preventing the crystals of devitrified glass from being produced or propagated into the interior of the cone of the delivery device and eventually even removing the crystals which are produced.

The electrodes O' and O", G and H may also be connected to a source of multi-phase current.

The electrodes O' and O" may at the same time act as electrode and as resistance. Fig. 3 shows a wiring diagram of the arrangement in this case, which increases the flexibility of the system.

In the modification shown in Figs. 4 and 5, the delivery device of refractory material is omitted and replaced by an electrode A, slit in the direction of its length by a slot D similar to that of the delivery device.

This electrode, of a material which conducts current, may act at the same time as a resistance. As in the preceding examples there are again provided the electrodes G and H placed on opposite sides of the drawing bath in the direction of its length. There is also provided the electrode I located at a lower level. Current can thus be established between the electrodes A and G, A and H, and between the electrodes G and I, and H and I. It will be understood that other combinations are also possible.

In all the arrangements described it is necessary to retain one essential point: the electrodes are made of metals or metal alloys. Experience has shown that a metal or metal alloy immersed in a bath of glass and reaching the temperature of the glass promotes the crystallisation of the latter. On the contrary when the metal or the alloy is brought in any suitable manner to a temperature higher than that of the glass, even if the difference of temperature is only from 10 to 30° C., it no longer promotes the formation of crystals. It is for this reason that the metal electrodes, hereinbefore referred to, may with advantage in certain cases be heated by a current separated from that which passes through the glass. This current utilises them as resistance and may thus maintain their temperature slightly above that of the glass.

In cases where it is difficult to heat the electrodes by an independent current, they are made of such dimensions that the current which is distributed in the glass heats them slightly above the temperature of the bath of glass by reason of their ohmic resistance.

For this purpose the electrodes G and H, and G' and H', shown in perspective in Fig. 6, show two forms of construction of which the results are satisfactory. The electrode G, for example, is formed by a distribution bar R which is practically without ohmic resistance. This bar is provided with a series of teeth similar to a rake. These teeth dip into the glass and then have a suitable ohmic resistance such that the current which passes through them for entering into the glass overheats them slightly, i. e. heats them at a temperature slightly above that of the bath of glass.

The same applies to the electrode H and to the electrode H' which is formed, as above described, of a distributing bar R having a very low ohmic resistance, the teeth being replaced by a blade D dipping into the glass. This blade is of such a thickness that the current which passes therethrough for entering the glass overheats it slightly. The same also applies to the modification H', in which the blade, dipping into the glass, is bent.

The electrodes may also be of other shapes. The electrode with teeth however has also the advantage of being capable of being introduced into the glass even if the latter has already congealed. For, when the teeth come into contact with the glass, there is produced around the contact points a current of high density, which generates a strong heat and thus produces the fusion of the glass in the vicinity thereof.

Drawing kilns in accordance with the invention are completed with advantage by a drawing arch heating electrically. An arch of this type is shown at T in Figs. 1, 2 and 4. A heating arch of this type enables the drawing temperature, above the level of the glass, to be maintained at a temperature independent of that of the glass.

What I claim is:

1. A device for electrically heating drawing kilns for sheet glass, comprising, in combination with the drawing kiln, a delivery device for the sheet of glass arranged longitudinally of said kiln and provided with conductive lips connected to a source of current so as to form electrodes, together with a number of metallic electrodes, arranged longitudinally of the kiln and substantially parallel to the line of draw of the sheet, and with a source of current, to which said electrodes are connected, so as to heat the bath of glass, by the Joule effect, by the passage of the current through the bath, transversely of the kiln.

2. A device for electrically heating drawing kilns for sheet glass, comprising, in combination with the drawing kiln, a delivery device for the sheet of glass arranged longitudinally of said kiln, said delivery device being formed by a metallic electrode provided with a longitudinal slot, together with a number of metallic electrodes, arranged longitudinally of the kiln and substantially parallel to the line of draw of the sheet, and with a source of current, to which said electrodes are connected, so as to heat the bath of glass, by the Joule effect, by the passage of the current through the bath, transversely of the kiln.

3. A device for electrically heating drawing kilns for sheet glass, comprising, in combination with the drawing kiln, a delivery device for the sheet of glass arranged longitudinally of said kiln, and comprising conductive lips connected to a source of current to form electrodes, and a number of metallic electrodes, arranged longitudinally of the kiln and substantially uniformly along the length thereof and extending substantially parallel to the line of draw of the sheet, said electrodes being connected with said source of current, so as to heat the bath of glass, by the Joule effect, by the passage of the current through the bath, transversely of the kiln, said conductive lips being connected to a second source of current, so as to be brought at a temperature above that of the bath of glass.

4. A sheet glass drawing apparatus, comprising, in combination, a kiln, an elongated delivery device through which a sheet of glass may be withdrawn, said delivery device being disposed within said kiln, elongated metallic electrodes extending on both sides of said delivery device and substantially parallel thereto, all of said electrodes contacting the molten glass bath and extending substantially from wall to wall of the kiln, and means connected with said electrodes for causing the flow of an electrical current within the molten glass bath from an electrode on one side of said delivery device to another electrode on the other side of said delivery device, whereby said electrical current flows transversely of the delivery device and outside of said glass sheet to heat the molten glass bath and avoid crystallization of the glass adjacent to the delivery device.

5. A sheet glass drawing apparatus, comprising, in combination, a kiln, an elongated delivery device through which a sheet of glass may be withdrawn, said delivery device being disposed within said kiln, elongated metallic electrodes extending on both sides of said delivery device and substantially parallel thereto, all of said electrodes contacting the molten glass bath and extending substantially from wall to wall of the kiln, another electrode extending substantially parallel to said delivery device and substantially below the same close to the bottom of the kiln, and means connected with said electrodes for causing the flow of an electrical current within the molten glass bath from an electrode on one side of said delivery device to another electrode on the other side of said delivery device, whereby said electrical current flows transversely of the delivery device and outside of said glass sheet to heat the molten glass bath and avoid crystallization of the glass adjacent to the delivery device.

6. A sheet glass drawing apparatus, comprising, in combination, a kiln, an elongated delivery device through which a sheet of glass may be withdrawn, said delivery device being disposed within said kiln, elongated metallic electrodes extending on both sides of said delivery device and substantially parallel thereto, all of said electrodes contacting the molten glass bath and extending substantially from wall to wall of the kiln, and means connected with said electrodes for causing the flow of an electrical current within the molten glass bath from an electrode on one side of said delivery device to another electrode on the other side of said delivery device, whereby said electrical current flows transversely of the delivery device and outside of said glass sheet to heat the molten glass bath and avoid crystallization of the glass adjacent to the delivery device, said electrodes including ohmic resistors which are so dimensioned that said electrical current heats them to a higher temperature than that to which it heats the portion of the molten glass bath through which it passes.

7. A sheet glass drawing apparatus, comprising, in combination, a kiln, an elongated delivery device through which a sheet of glass may be withdrawn, said delivery device being disposed within said kiln, elongated metallic electrodes extending on both sides of said delivery device and substantially parallel thereto, all of said electrodes contacting the molten glass bath and extending substantially from wall to wall of the kiln, and means connected with said electrodes for causing the flow of an electrical current within the molten glass bath from an electrode on one side of said delivery device to another electrode on the other side of said delivery device, whereby said electrical current flows transversely of the delivery device and outside of said glass sheet to heat the molten glass bath and avoid crystallization of the glass adjacent to the delivery device, each of said electrodes including a distributor bar having substantially no ohmic resistance, and a plurality of teeth carried by said distributor bar and dipping into the molten glass bath, said teeth consisting of ohmic resistances which are so dimensioned that said electrical current heats them to a higher temperature than that to which it heats the portion of the molten glass bath through which it passes.

8. A sheet glass drawing apparatus, comprising, in combination, a kiln, an elongated delivery device through which a sheet of glass may be withdrawn, said delivery device being disposed within said kiln, elongated metallic electrodes extending on both sides of said delivery device and substantially parallel thereto, all of said electrodes contacting the molten glass bath and extending substantially from wall to wall of the kiln, and means connected with said electrodes for causing the flow of an electrical current within the molten glass bath from an electrode on one side of said delivery device to another electrode on the other side of said delivery device, whereby said electrical current flows transversely of the delivery device and outside of said glass sheet to heat the molten glass bath and avoid crystallization of the glass adjacent to the delivery device, each of said electrodes including a distributor bar having substantially no ohmic resistance, and a blade carried by said distributor bar and dipping into the molten glass bath, said blade having an ohmic resistance which is so dimensioned that said electrical current heats it to a higher temperature than that to which it heats the portion of the molten glass bath through which it passes.

9. A sheet glass drawing apparatus, comprising, in combination, a kiln having an arch, means electrically heating said arch, an elongated delivery device through which a sheet of glass may be withdrawn, said delivery device being disposed within said kiln, elongated metallic electrodes extending on both sides of said delivery device and substantially parallel thereto, all of said electrodes contacting the molten glass bath and extending substantially from wall to wall of the kiln, and means connected with said electrodes for causing the flow of an electrical current within the molten glass bath and from an electrode on one side of said delivery device to another electrode on the other side of said delivery device, whereby said electrical current flows transversely of the delivery device and outside of said glass sheet to heat the molten glass bath and avoid crystallization of the glass adjacent to the delivery device.

EDOUARD VIRGILE BOREL.